United States Patent [19]

Landgräber et al.

[11] 4,454,054

[45] Jun. 12, 1984

[54] SODIUM TRIPOLYPHOSPHATE, PROCESS FOR MAKING IT, AND ITS USE

[75] Inventors: Herbert Landgräber, Hürth; Werner Kowalski, Weilerswist, both of Fed. Rep. of Germany; Johan Scheffer, Vlissingen, Netherlands; Hans Haas, Swisttal-Strassfeld, Fed. Rep. of Germany

[73] Assignee: Hoechst Aktiengesellschaft, Fed. Rep. of Germany

[21] Appl. No.: 399,756

[22] Filed: Jul. 19, 1982

[30] Foreign Application Priority Data

Jul. 23, 1981 [DE] Fed. Rep. of Germany ....... 3129079

[51] Int. Cl.³ .................... C01B 25/30; C01B 25/40; C11D 3/06; C11D 11/02
[52] U.S. Cl. .................................. 252/135; 252/109; 252/133; 252/174; 252/175; 423/265; 423/275; 423/306; 423/315
[58] Field of Search ............. 423/306, 315, 265, 275; 252/109, 133, 135, 175

[56] References Cited

U.S. PATENT DOCUMENTS

| | | | |
|---|---|---|---|
| 3,272,752 | 9/1966 | Hartlapp | 252/135 |
| 3,350,318 | 10/1967 | Green | 252/135 |
| 3,383,321 | 5/1968 | Davis | 252/135 |
| 3,397,947 | 8/1968 | Shaver | 423/315 |
| 3,770,644 | 11/1973 | Huttinger | 252/135 |

Primary Examiner—Dennis L. Albrecht
Attorney, Agent, or Firm—Connolly and Hutz

[57] ABSTRACT

The disclosure relates to sodium tripolyphosphate containing up to 95 weight % phase-I, 0.1 to 22 weight % water of crystallization and 0.01 to 2.0 weight %, calculated as metal, of a compound of the metals selected from calcium, magnesium, zinc or strontium, the compound yielding ions in an aqueous medium. The disclosure also relates to a process for making the tripolyphosphate, and to its uses.

2 Claims, 2 Drawing Figures

Knead Resistance (Viscosity) of Detergent Slurries Determined in Brabender-Plastograph 1 = Slurry with 60 Weight % Solids and Sodium Triphosphate of Modification B (Table 1)
2 = Slurry with 70 Weight % Solids and Sodium Triphosphate of Modification B (Table 1)
3 = Slurry with 60 Weight % Solids and Sodium Triphosphate of Modification B*(Table 1)
4 = Slurry with 70 Weight % Solids and Sodium Triphosphate of Modification B*(Table 1)

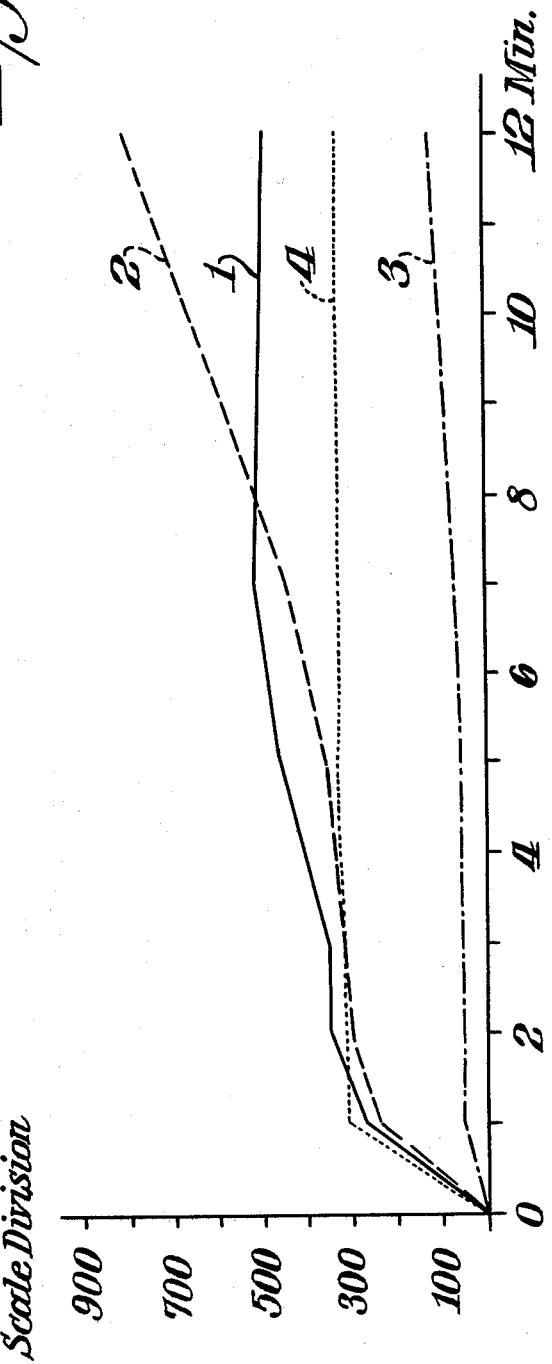

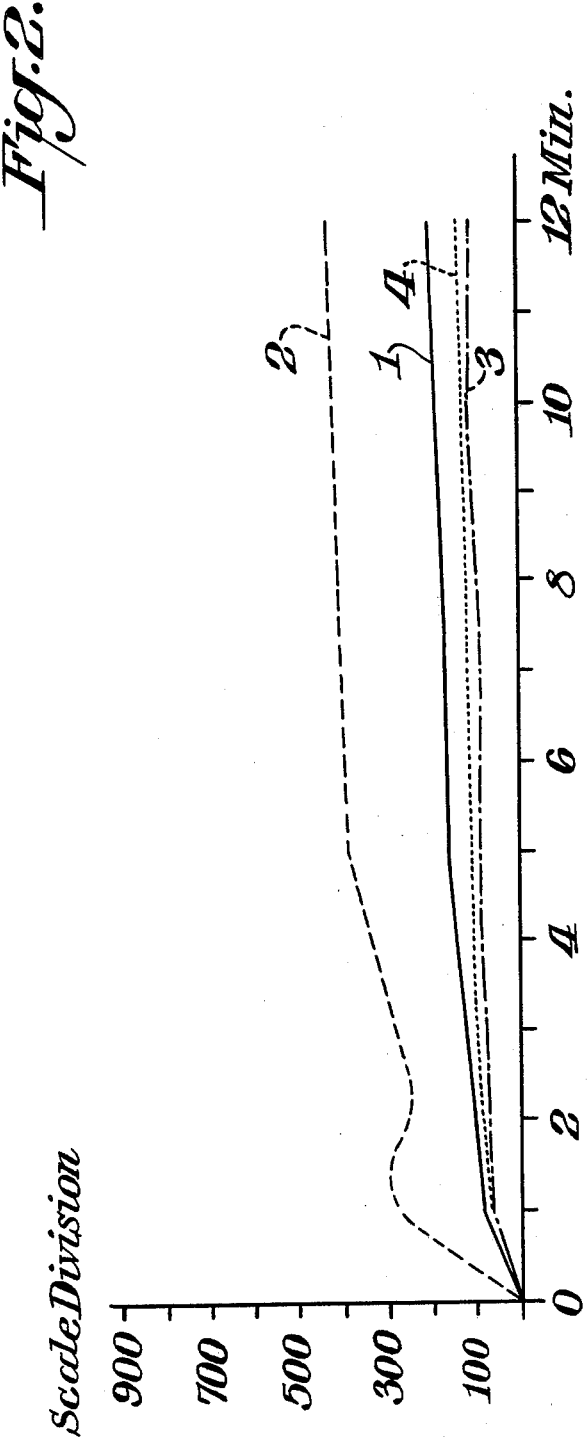

SODIUM TRIPOLYPHOSPHATE, PROCESS FOR MAKING IT, AND ITS USE

The present invention relates to sodium triphosphate (sodium tripolyphosphate) whose hydration velocity can be acted upon so that aqueous suspensions thereof produce slurries of low viscosity, to a process for making the tripolyphosphate and to its uses.

Anhydrous sodium tripolyphosphate $Na_5P_3O_{10}$ exists in two modifications termed high temperature phase-I and low temperature phase-II. With water, $Na_5P_3O_{10}$ forms hexahydrate.

The hydration and viscosity behaviour in an aqueous slurry greatly depends on the proportion of the high or low temperature phase in the phosphate. Phase-I undergoes rapid hydration while phase-II undergoes hydration considerably more reluctantly.

Rapid hydration (high phase-I content) means rapid combination with water, i.e. rapid and extensive conversion to hexahydrate. As a result, an aqueous suspension of such product is highly viscous so that it is necessary to use special equipment, e.g. effective stirrers, for converting rapidly hydrating phosphates e.g. to spray-dried detergents; in addition to this, it is necessary for the slurry to be spray-dried as rapidly as possible. In the extreme case, the slurry may even concentrate to a stiff mass awaiting dilution with water which must subsequently be evaporated with additional expenditure of energy.

The properties of reluctantly hydrating phosphates with a high proportion of low temperature phase therein do, however, not under all aspects favorably compare with those of more rapidly hydrating phosphates containing more phase-I.

Reluctant hydration means less rapid combination with water; the transformation to hexahydrate in the slurry remains incomplete. Uncombined surface water in excess is retained which effects coalescence and seriously impairs the storability of a ready-for-use pulverulent detergent. As a result of such incomplete or delayed hydration, it may become necessary in the finished product to reduce the water-content down to a level distinctly below that desired and/or necessary for effecting complete crystallization to $Na_5P_3O_{10}.6H_2O$.

On the other hand, in the event of the sodium tripolyphosphates used undergoing hydration sufficiently rapidly, it is possible in the finished product to optimize the water-content; in other words, the proportion of combined water therein ideally corresponds to the proportion needed for the formation of $Na_5P_3O_{10}.6H_2O$.

A significant effect in which reluctantly hydrating triphosphates compare unfavorably with rapidly reacting material resides in the need for them to remain in the slurry over a relatively long period of time during which undesirable, namely less effective hydrolysis products (orthophosphate and pyrophosphate) are being formed.

Various processes permitting the viscosity of triphosphates in aqueous suspension to be acted upon have already been described. DE-AS No. 1 371 161 (corresponding to U.S. Pat. No. 3,272,752 to Hartlapp et al, issued Sept. 13, 1966), for example, describes the manufacture of anhydrous calcium-containing tripolyphosphate whose viscosity path is considerably evener that that of material free from calcium.

A detergent slurry made from these phosphates remains slightly viscous, is easy to stir and does not coalesce even after having been allowed to stand for some prolonged time. Adverse effects which are associated with detergents made from these phosphates reside in the fact that a good deal of water is present as surface water which greatly affects the product's storability. As a result, it is necessary for the proportion of water contained in the final product to be reduced. In addition to this, the product contains hydrolyzed material in proportions which distinctly affect its cleaning power.

It is also known (DE-AS No. 25 54 487) that the velocity of hexahydrate formation in the slurry can be acted upon by subjecting sodium tripolyphosphate to partial hydration. Partially hydrated tripolyphosphates containing 0.2 up to 3 weight % of $H_2O$ in the slurry undergo hydration considerably more rapidly than anhydrous triphosphate with an identical phase-I content. Hexahydrate formation is incidentally promoted by the addition of seed crystals.

These products are however of limited processability. This is due to the relatively high viscosity of the slurry which in turn depends on the particular method and the conditions used for making the slurry.

Partially hydrated sodium triphosphate containing minor proportions of certain bivalent metals has now unexpectedly been found to present novel and unexpected properties. Partially hydrated triphosphate which has ions of these metals contained in it is no longer liable to form a highly viscous slurry; on the other hand, its hydration velocity is not unduly impaired by these metal ions, so that complete combination with water remains indeed unaffected.

This is highly desirable in practice as the slurry first prepared and ultimately sprayed remains slightly viscous. The resulting final product containing completely combined water of hydration and being practically free from surface water.

The present invention provides more particularly sodium triphosphate containing up to 95 weight % of phase-I, 0.1 to 22 weight % of water of crystallization, and 0.01 to 2.0 weight %, calculated as metal, of a compound of a metal selected from calcium, magnesium, zinc and strontium, the compound yielding ions in an aqueous medium.

The technically beneficial effects described hereinabove are more particularly obtained with the use of sodium tripolyphosphate containing up to 40 weight % of phase-I, 0.3 to 3.0 weight % of water of crystallization, and 0.1 to 0.6 weight % of the metal compounds specified.

The metal compounds should preferably be used in the form of an oxide, phosphate, sulfate or carbonate.

The most effective metal compounds are those of calcium, magnesium and zinc, the strontium compound being less effective.

The invention also relates to a process for making the novel sodium tripolyphosphate.

To this end, the invention provides for anhydrous sodium tripolyphosphate containing up to 95 weight % of phase-I, preferably up to 40 weight % of phase-I, to be mixed with ion-yielding compounds of the metals selected from calcium, magnesium, zinc or strontium, the compounds being used in a proportion of 0.01 to 2.0 weight %, preferably 0.1 to 0.6 weight %, calculated as metal, and for the resulting mixture to be hydrated in known fashion until the sodium triphosphate contains 0.1 to 22 weight % of water of crystallization.

A further method of preparing the product of this invention provides for a sodium orthophosphate slurry containing Na₂O and P₂O₅ in a molar ratio corresponding to the Na₂O:P₂O₅-ratio desired for the sodium tripolyphosphate to be admixed with the metal compound, for the slurry to be spray-dried in known fashion and to be thereby converted to sodium triphosphate, and for the spray-dried product to be hydrated in known manner until establishment of a desired content of water of crystallization.

This latter method can be varied and then provides for the metal compound, which should be used in the form of an aqueous solution or suspension, to be spray-dried jointly with the orthophosphate slurry, the metal compound solution or suspension being preferably brought into contact with the orthophosphate slurry inside the fluidization-inducing chambers of the spray nozzle. As a technically beneficial effect of this, precipitation of material in the orthophosphate slurry is not liable to occur.

Their special properties make the products of this invention particularly suitable for the manufacture of detergents by spray-drying an aqueous slurry of the individual detergent components.

As already mentioned above, it is possible for the tripolyphosphate to be partially hydrated in known fashion, e.g. by subjecting it to treatment with steam or water inside a rotary tube, fluidized bed or similar device.

EXAMPLE 1

Tripolyphosphate was made by the one-step spray process. To this end, an orthophosphate slurry of 22.5 m³=36 tons was prepared. It contained 30 weight % of $P_2O_5$.

117 kg $MgCO_3$ was suspended in 100 l orthophosphoric acid and the suspension was added to the orthophosphate slurry. A Na:P-ratio of 5:3 was established in the slurry.

Next, the whole was sprayed in known fashion inside a spray tower operated at an off-gas temperature of 400° C.

The final tripolyphosphate contained 97.6% $Na_5P_3O_{10}$, 0.2% Mg, and about 23% phase-I.

The product was steam-treated in an expansion chamber and delivered pneumatically to a bunker. The product contained 0.3% water of crystallization.

EXAMPLE 2

An orthophosphate slurry was made as described in Example 1. In a separate vessel, 115 kg dicalcium phosphate (DCP) was suspended in 500 l water and the suspension was directly admitted with the aid of a pump to the spray nozzle inside the spray tower in which the orthophosphate slurry was sprayed.

Inside the fluidization-inducing chambers of the spray nozzle, the orthophosphate solution and DCP-suspension became intimately mixed and were sprayed jointly. The final product contained 0.6% $Ca^{++}$.

It was steam-treated as described in Example 1. The product contained 0.3% $H_2O$ and about 23% phase-I.

EXAMPLE 3

A detergent slurry containing 60% solid matter was prepared. The slurry had the composition indicated in Table 2 hereinafter and was made with the use of sodium tripolyphosphate modification B of Table 1. In a Brabender plastograph, the slurry was tested for its viscosity which was related to the stirring period. The knead resistance is shown in curve 1 of FIG. 1, the scale graduations as an index of viscosity, indicated by the plastograph in each particular case being plotted against the respective stirring period.

EXAMPLE 4

A detergent slurry containing 70% solid matter was prepared. It had the composition indicated in Table 2 and was made with sodium tripolyphosphate modification B of Table 1. In a Brabender plastograph, the slurry was tested for its viscosity, which was related to the stirring period. The viscosity behaviour was as shown by curve B in FIG. 1.

EXAMPLES 5 AND 6

Standard slurries containing 60 and 70%, respectively, of solid matter were made as shown in Table 2 with the use of triphosphate prepared as described in Example 2 (modification B* in Table 1). The viscosity curves 3 and 4 determined in the plastograph are shown in FIG. 1.

EXAMPLES 7 TO 10

As described in Examples 3 to 6, sodium tripolyphosphate modifications C and C*, respectively, of Table 1 (produced as described in Example 2) were used in the detergent slurries containing 60 and 70%, respectively, of solid matter (Table 2). Curves 1 to 4 in FIG. 2 show the results obtained.

EXAMPLE 11 (CF. TABLE 3-A)

500 kg detergent slurry with 60% solid matter content was made and used in a pilot plant. It had the composition indicated in Table 2 and was made with the use of anhydrous sodium tripolyphosphate (modification A in Table 1). After about 20 minutes, the highly viscous slurry was sprayed while hot in a spray tower. Coalesced product was obtained. It was moist due to its unduly high water content of 16.9%. 10% of the sodium tripolyphosphate used underwent hydrolysis.

EXAMPLES 12 AND 13 (CF. TABLES 3B* (I) AND B* (II))

Two 500 kg detergent slurries of which each contained 60% solid matter (Table 2) were prepared with the use of sodium tripolyphosphate made as described in Example 1 (modification B* in Table 1) and used in a pilot plant. After a stirring period of 10 minutes, the viscosity was at the constant values of 19.20 and 21.75 Pa.s, respectively, and the slurry was sprayed.

The final products were dry, non-dusty and readily flowable even after storage over a period of 14 days. The water contents of 11.3 and 10.4%, respectively, corresponded approximately to the proportion of water theoretically necessary for the formation of $Na_5P_3O_{1.6}$-$H_2O$. Only 4.6 and 5.6%, respectively of sodium tripolyphosphate modification B* underwent hydrolysis.

EXAMPLE 14 (CF. TABLE 3B* (III))

500 kg detergent slurry containing 70% solid matter (Table 2) was made with the use of sodium tripolyphosphate produced as described in Example 1 (modification B* in Table 1) and used in a pilot plant.

After a stirring period of 10 minutes, the viscosity was constant at 28.50 Pa.s; the slurry was easy to spray.

The spray product was dry, free from dust and readily flowable at once. It contained 10% water. This corresponded approximately to the proportion of water theoretically necessary for the formation of $Na_5P_3O_{10}\cdot 6H_2O$. Less than 7% underwent hydrolysis.

TABLE 1

Sodium tripolyphosphate modification used in Examples 3 to 14

| | Modification | | | | |
|---|---|---|---|---|---|
| | A | B | B* | C | C* |
| % $P_2O_5$ | 57.5 | 57.5 | 57.5 | 55.7 | 55.7 |
| % Mono- } phosphate | | | | | |
| % Di- } | 2.2 | 2.5 | 2.4 | 6.4 | 6.7 |
| % Tri- } | 97.8 | 97.5 | 97.6 | 93.6 | 93.3 |
| % Loss on ignition (360° C.) | 0.1 | 0.3 | 0.3 | 2.5 | 2.7 |
| % Phase-I | 33 | 24 | 23 | 41 | 39 |
| Hydration velocity (°C.) | | | | | |
| after 0 minute | 80.0 | 80.0 | 80.0 | 80.0 | 80.0 |
| 0.5 minute | 81.6 | 83.9 | 84.5 | 86.0 | 87.0 |
| 1 minute | 83.1 | 86.1 | 86.0 | 89.3 | 88.8 |
| 3 minutes | 86.5 | 92.2 | 92.0 | 91.1 | 90.1 |
| 5 minutes | 90.8 | 94.0 | 93.0 | 91.2 | 90.1 |
| 10 minutes | 92.9 | 94.0 | 93.0 | 90.0 | 89.5 |

Phase-I, based on total phosphate
*with sodium tripolyphosphate modification of invention

TABLE 2

Standard slurries with modified STPP-grades; knead resistance (= viscosity) determined in Brabender plastograph

| Formulation of final product | Quantity (%) 60% | used for making with solid matter | slurry 70% |
|---|---|---|---|
| Sodium tripolyphosphate (in each case as indicated in Table 1) | 36 | 32 | 37.4 |
| Alkylbenzene sulfonate | 9 | 10.7[1] | 12.5[1] |
| Non-ionic surfactant | 3 | 2.7 | 3.1 |
| Pulverulent soap | 3 | 2.7 | 3.1 |
| Mg-silicate | 3 | 2.7 | 3.1 |
| Na-silicate | 3 | 6.1[2] | 7.0[2] |
| Methyl cellulose | 1 | 0.9 | 1.1 |
| Na-perborate | 25 | — | — |
| Na-sulfate | 8.5 | 7.5 | 8.8 |
| p-toluene sulfonate | 1 | 0.9 | 1.1 |
| $H_2O$ | 7.5 | 33.9 | 22.9 |

[1] with 25% water
[2] sodium water glass with 55.5% water

TABLE 3

Manufacture of detergents by hot spray process with use of sodium tripolyphosphate modifications of invention (cf. Table 1)

| | Na-triphosphate modifications (Table 1) | | | |
|---|---|---|---|---|
| Process and product parameters | A | B* (I) | B* (II) | B* (III) |
| Slurry: % solid matter | 60 | 60 | 60 | 70 |
| Slurry temperature °C. | 80 | 80 | 80 | 80 |
| Viscosity (Pa.s) | 40.00 | 19.20 | 21.75 | 28.50 |
| (Brookfield viscosimeter, 12 rpm) | | | | |
| Spray product: % $P_2O_5$ | 24.5 | 25.2 | 23.6 | 23.4 |
| % Mono- } | 0.8 | 0.6 | 0.8 | 0.7 |
| % Di- } phosphate | 4.3 | 2.6 | 2.6 | 3.0 |
| % Tri- } | 37.7 | 40.6 | 37.6 | 37.1 |
| % Total phosphate | 42.8 | 43.8 | 41.0 | 40.8 |
| Tripolyphosphate not hydrolyzed (%) | 88 | 93 | 92 | 91 |
| % $H_2O$ (loss on ignition at 105° C. after 3 h) | 16.9 | 11.3 | 10.4 | 10.0 |
| Apparent density (kg/l) | 0.4 | 0.36 | 0.39 | 0.38 |

We claim:

1. A process for making sodium tripolyphosphate containing up to 95 weight % phase I and 0.1–22.0 weight % water of crystallization and having improved properties for preparing aqueous slurries being intended for the production of detergents based on sodium tripolyphosphate, which process comprises (a) spray-drying jointly an aqueous sodium orthophosphate suspension containing $Na_2O$ and $P_2O_5$ in a molar ratio corresponding to the $Na_2O:P_2O_5$ ratio desired for the sodium tripolyphosphate and an aqueous solution or suspension of a compound of a metal selected from calcium, magnesium, zinc or strontium, said metal compound yielding ions in an aqueous medium and being used in amounts of 0.01 to 2.0 weight % calculated as metal and related to the sodium tripolyphosphate;

(b) carrying out the spray-drying by contacting the said orthophosphate suspension and the solution or suspension of the metal compound inside the fluidization-inducing chamber of a spray nozzle and (c) hydrating the resulting spray-product in known fashion until the spray-product has reached the desired content of water of crystallization.

2. Process as claimed in claim 1, wherein the metal compound is used in proportions of 0.1 to 0.3 weight %, calculated as metal.

* * * * *